(Model.)
H. L. FREEMAN.
COTTON OR OTHER PRESS.
No. 243,879. Patented July 5, 1881.
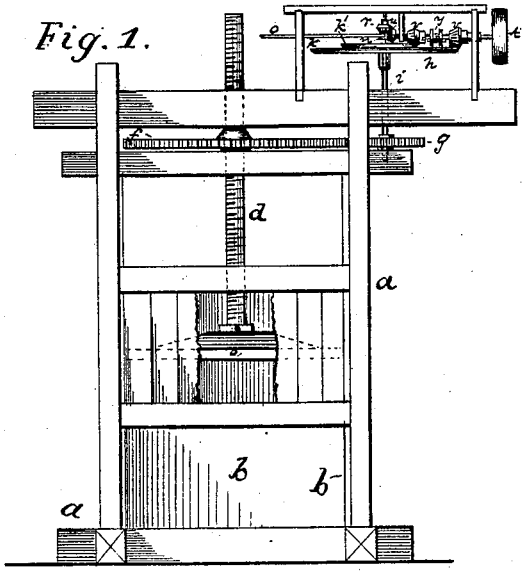
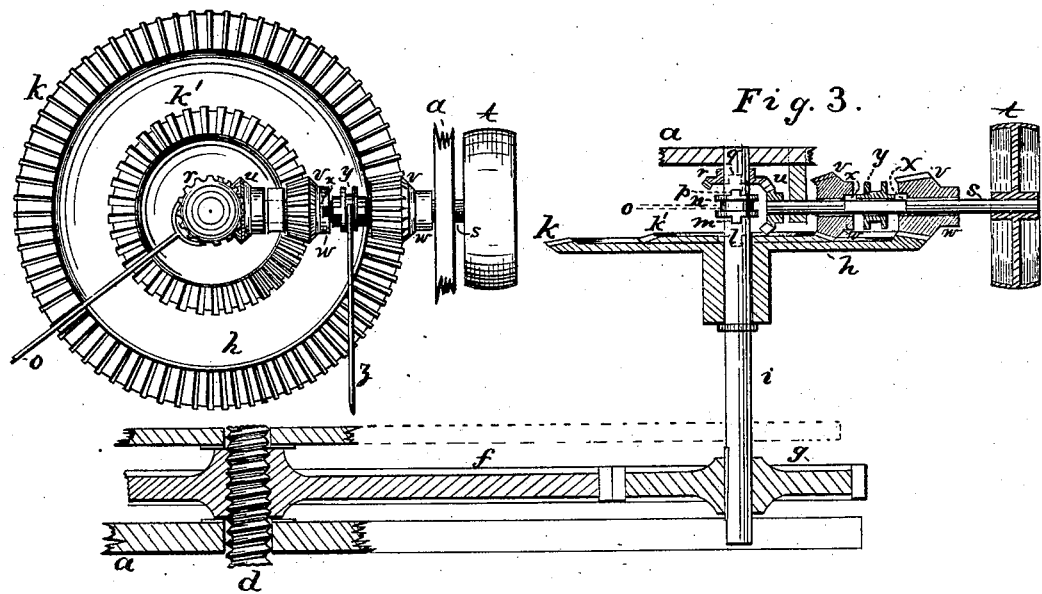
WITNESSES:
Thos. Houghton.
Colon P. Kemon
INVENTOR:
H. L. Freeman
BY
ATTORNEYS.

UNITED STATES PATENT OFFICE.

HORACE L. FREEMAN, OF ALBEMARLE, NORTH CAROLINA.

COTTON OR OTHER PRESS.

SPECIFICATION forming part of Letters Patent No. 243,879, dated July 5, 1881.

Application filed June 3, 1881. (Model.)

*To all whom it may concern:*

Be it known that I, HORACE L. FREEMAN, of Albemarle, in the county of Stanly and State of North Carolina, have invented a new and useful Improvement in Cotton or other Presses; and I do hereby declare that the following is a full, clear, and exact description of the same, reference being had to the accompanying drawings, forming part of this specification, in which—

Figure 1 is a side elevation of my improved cotton-press. Fig. 2 is a plan view of the gearing for operating the follower, and Fig. 3 is a central vertical section through the operating mechanism.

My invention relates to improvements in cotton or other presses; and it consists in the peculiar construction and arrangement of the parts, as hereinafter more fully set forth.

In the accompanying drawings, $a$ represents the frame of my improved press, provided with side and end doors, $b$, a vertical screw-shaft, $d$, secured at its lower end to the follower $e$, and passing through the screw-threaded hub of a large cog-wheel, $f$, which meshes with a smaller pinion, $g$, all of the usual construction. $h$ represents a horizontal wheel, provided with a hub adapted to rest on projections on the vertical shaft $i$ of the pinion $g$, which projections support the wheel, which is loose on the vertical shaft $i$. The upper face of the wheel $h$ is provided with a circular bevel-gear, $k$, near its circumference, and an inner circular bevel-gear, $k'$, near its center, concentric with the outer bevel-gear. The upper face of the double bevel-gear wheel $h$ is also provided on opposite sides of its central orifice with two recesses, $l\ l$, adapted to receive the projections $m\ m$ on the lower edge of the double clutch $n$, when the latter is slid down on the shaft $i$ by the lever $o$, the double clutch $n$ and vertical shaft $i$ being secured together by a feather or spline on the shaft, engaging in a recess in the inner face of the clutch, so that they will revolve together, and at the same time the clutch may be slid along the shaft. By this construction the double gear-wheel $h$, loose on the vertical shaft $i$, can be secured to it, when desired, by sliding down the clutch $n$, so as to revolve with the shaft $i$. The upper face of the double clutch $n$ is provided with the opposite projections, $p\ p$, adapted to engage, when the double clutch is raised by the lever $o$, with the opposite recesses, $q\ q$, in a miter-gear wheel, $r$, loose on the shaft $i$.

$s$ represents a horizontal shaft supported in bearings in the frame, and carrying at its outer end a band-pulley, $t$, to which the power for driving the press is applied. The horizontal shaft $s$ is provided on its inner end with a miter-gear, $u$, fast on the shaft and meshing with the miter-gear $r$, and said shaft is made square at its center and round on each side of the squared central portion to receive the bevel-gears $v\ v$, of the same size, loose on the shaft $s$, and each provided with a collar, $w$, having opposite recesses, $x$, adapted to engage with projections on the opposite faces of a double clutch, $y$, having a square central orifice, and adapted to slide on the squared portion of the shaft $s$, so as to cause either bevel-gear $v$ to revolve with the shaft $s$ by sliding the double clutch by means of the lever $z$, or allowing neither of the bevel-gears $v$ to be clutched to the shaft $s$.

It will be seen that in the above-described construction the outer bevel-gear, $v$, meshes with the outer bevel-gear, $k$, of the wheel $h$, and the inner bevel-gear, $v$, meshes with the inner bevel-gear, $k'$, of the wheel $h$, concentric with the outer bevel-gear.

In practice, when the cotton or other material has been introduced into the box or receptacle and but little power is required to force the cotton down into the box in its loose state, the double clutch on the vertical shaft is lowered by its lever, locking the double bevel-gear wheel to the vertical shaft, and the clutch on the horizontal shaft is moved inwardly or toward the vertical shaft, making the inner bevel-wheel fast on the horizontal shaft, said inner bevel-wheel meshing with the inner bevel-gear of the double bevel-gear wheel, so as to drive the screw-shaft and follower down rapidly, when but little power is required to press the cotton. When greater power is required the clutch on the horizontal shaft is shifted by its lever, so as to make the outer bevel-wheel fast on the horizontal shaft, when said bevel-gear, meshing with the outer bevel-gear on the double bevel-gear wheel, will impart greater power to the follower and less speed.

In order to raise the follower rapidly the clutch on the vertical shaft is raised, unclutching the double bevel-gear wheel from its vertical shaft and clutching the loose miter-gear on the upper end of the vertical shaft thereto, whereby the follower can be raised with great rapidity, the miter-gears, fast on their respective shafts, meshing with each other.

By this construction time is gained, when but little power is requisite, and greater power may readily be applied to the follower when needed.

What I claim as new is—

1. The combination, with the double bevel-gear wheel $h$, loose on the vertical shaft $i$, and double clutch $n$, of the horizontal shaft $s$, bevel-gears $v\,v$, loose on said shaft, and double clutch $y$, substantially as described, and for the purpose set forth.

2. The combination, with the vertical shaft $i$, carrying the miter-gear wheel $r$ and double bevel-gear wheel $h$, both loose on said shaft, and double clutch $n$, of the horizontal shaft $s$, carrying the miter-gear $u$, fast on said shaft, bevel-gears $v\,v$, loose on said shaft, and double clutch $y$, substantially as described, and for the purpose set forth.

3. The combination of the screw-shaft $d$, carrying the follower $e$ and cog-wheel $f$, shaft $i$, carrying the pinion $g$, double bevel-gear wheel $h$, and miter-gear wheel $r$, all loose on said shaft, double clutch $n$, horizontal shaft $s$, carrying the miter-gear wheel $u$, fast on said shaft, and loose bevel-gears $v\,v$, and the double clutch $y$, substantially as described, and for the purpose set forth.

HORACE LIZZELLE FREEMAN.

Witnesses:
JOHN T. REDWINE,
WILLIAM T. MILTON.